UNITED STATES PATENT OFFICE.

JOKICHI TAKAMINE, OF NEW YORK, N. Y.

DIASTATIC SUBSTANCE AND METHOD OF MAKING SAME.

No. 826,699.　　　Specification of Letters Patent.　　　Patented July 24, 1906.

Application filed January 21, 1905. Serial No. 242,116.

*To all whom it may concern:*

Be it known that I, JOKICHI TAKAMINE, a subject of the Emperor of Japan, residing in the borough of Manhattan, in the city, county, and State of New York, have invented and discovered new and useful Diastatic Substances and Method of Producing the Same, of which the following is a specification.

My invention relates to diastatic substances or enzyms having the property of converting starch or the starchy constituents of grains, roots, tubers, or other portions of vegetable anatomy into sugars.

The object of my invention is to isolate and render useful and available for use in the arts a certain diastatic principle or enzym which I have discovered in the seeds, grains, roots, tubers, or other portions of vegetable structure or composition, and, further, to produce said principle or enzym in a permanent stable form, in which it may be kept or stored without deteriorating or losing its properties.

A further object of my invention is to produce a new diastatic substance having liquefying and saccharifying properties in which these properties are adjusted so that the starch liquefied by the liquefying properties may be saccharified by the saccharifying principle or so adjusted that the saccharifying properties of the diastase are not in excess.

It is well known that diastatic enzyms in general possess the characteristic property of converting starch into sugars. This conversion passes through various distinctive stages.

First. The first is the liquefying stage, wherein the starch is liquefied or dissolved.

Second. The next stage is the dextrifying stage, in which the liquefied or dissolved starch is transformed into dextrin. This is a transition stage and for the purposes of this specification may be left out of further consideration.

Third. The final stage is the saccharifying stage, in which the dextrin is transformed into sugars.

I have discovered that these separate and distinct stages in the conversion of starch, or at least the liquefying and saccharifying stages, are produced by separate and distinct enzymotic agents which exist together in varying proportions in diastases heretofore known and used. Whereas these different enzymotic agents may all be present in known diastases, they do not occur therein in the most advantageous or desirable proportions for the economic conversion of starch or starchy materials into sugar. For example, in a certain diastase the proportion of liquefying enzym present may be in excess of that required to liquefy the amount of starch which the saccharifying enzym present can convert to sugar. In another diastase the relative proportions of the liquefying and saccharifying enzyms may be the reverse of the foregoing example. By my invention the proportions of the liquefying and saccharifying enzyms may be adjusted and a new diastatic substance produced having liquefying and saccharifying enzyms in the most advantageous proportions for securing the greatest efficiency in result and saving in the material used and wherein the proportion of each enzym is such as to convert completely a given mass of starch or starchy material without there being a surplus of one enzym over the other or any portion of the starch remaining unconverted.

It is well known that diastases at present known and used are produced by the germination of seeds or grains, usually of cereals, the growth being conducted under proper conditions of temperature and humidity or by the growth of certain fungi upon suitable culture media. Diastases so produced possess both starch liquefying and saccharifying properties, and hence cause the transformation of starch into sugars; but such diastases are irregular and variable in the relative proportions of liquefying and saccharifying enzyms present therein, and hence their action is more or less uncertain, conjectural, and incomplete.

I have discovered that an enzym having marked saccharifying diastatic properties may be produced from the seeds or grains of cereals which have not been subjected to germination nor to the growth of fungi thereon or from the epidermis or cuticular portions of said grains remaining after the removal of the whole or larger part of the starchy constituents and not subjected to fungoid growth. In order to obtain this enzym, I take a suitable quantity of broken or coarsely-ground grain—such as barley, corn, wheat, rice, or other grain or tubers—or a quantity of such grain from which the whole or larger part of the starchy constituents have been removed— *e. g.*, of bran, shorts, middlings, or the like— and macerate, percolate, or otherwise extract the same with water at the ordinary temperature or slightly above. For the sake of conciseness and to save repetition I employ in the claims the terms "grains" and "roots" as generic expressions to designate materials suitable for use in carrying out the invention, it being understood that such materials are best treated in a broken, ground, or comminuted condition to obtain the fluid extract therefrom. The extract so obtained is a brownish or yellowish liquid, the color being dependent upon the materials selected.

This extract or the raw material from which it is obtained is without effect or without appreciable effect upon gelatinized starch, so that in the ordinary sense of the word such extract has no diastatic power, except possibly in very minute quantity of no practical use in the arts. I have discovered, however, that it contains a powerful saccharifying enzym, which may be rendered available by first liquefying starch with a liquefying diastatic agent or other substance possessing the property of making starch soluble—such, for instance, as weak acids. As soon as the starch is in process of liquefaction the extract obtained, as above described, exerts a powerful and rapid saccharifying effect upon it, quickly and effectively causing its transformation into sugars. Thus by mixing a portion of the extract with a diastatic agent possessing liquefying properties with respect to starch the conversion of the starch into sugar proceeds with greatly-increased rapidity. This can readily be observed by comparative tests with the well-known iodin reaction.

I have found that the extract containing the saccharifying enzym above mentioned deteriorates or loses its power on keeping when in the form of a weak solution; but I have discovered that if the said extract be evaporated under reduced pressure or in vacuum until it assumes a syrupy consistency its saccharifying properties may be preserved for a considerable period. I have also found that the saccharifying enzym existing in the extract is difficultly soluble in alcohol, and may, therefore, be separated from non-active ingredients of the extract by the addition of a sufficient amount of alcohol. The saccharifying enzym thus obtained when freed from alcohol and dried is a whitish powder and has a remarkable power of saccharifying starch which has been previously liquefied either by the agency of a liquefying enzym or weak acids.

The production of this saccharifying enzym and its isolation and separation constitute one feature of my invention.

Another feature of my invention consists in the application of the said saccharifying enzym to the production of a new and valuable diastatic agent. By means of the extract herein described or of the saccharifying principle isolated or separated therefrom I am enabled to produce a general diastase having greatly-increased efficiency in causing the conversion of starch into sugar. This I accomplish by adding or admixing with a diastase or other substance possessing starch-liquefying properties and deficient in saccharifying properties a proportion of the saccharifying extract or of the isolated principle herein described and obtaining thereby a diastatic agent which will convert starch into sugar with much greater rapidity, completeness, and efficiency than the ordinary diastases used.

This new diastase may be produced in various ways: To a solution containing an ordinary diastase or a substance possessing starch-liquefying properties, but deficient in saccharifying properties, is added a portion of the extract herein described sufficient to saccharify all the starch which the liquefying properties of the first diastase will liquefy or render soluble. This proportion is dependent upon the liquefying capacity of the selected diastase or substance having liquefying properties and is readily determined by the skilled worker. The above solution thus made may be evaporated to a syrupy condition or to a dry mass under reduced pressure, or a dry diastatic agent of improved character in which the proportions of liquefying and saccharifying principles are properly balanced, as stated above, may be obtained by precipitating the mixed fluid with alcohol and separating and drying the precipitate. This precipitate constitutes a diastatic agent with both liquefying and saccharifying principles and of much more vigorous, complete, and efficient action than the original diastases and will much more rapidly and thoroughly convert a given amount of starch to sugar, or suitable proportions of ordinary diastase in dry form may be mixed with the isolated or precipitated saccharifying enzym herein decipitated and a greatly-improved diastase obtained of the same efficient character, as by the methods above described.

The new diastatic agent, whether in the form of a fluid or in dry form, and the process of producing the same and having its saccharifying diastatic properties composed of or augmented by the saccharifying diastatic principle herein described also forms a feature of my invention.

A further feature of my invention consists in the process which I have discovered for preserving and preventing the new saccharifying diastatic agent herein described from deterioration, whereby the same may be made stable and kept or stored indefinitely without losing its properties. I have found that the new diastatic substance above referred to, consisting of a diastase having saccharifying diastatic properties imparted to it by the new saccharifying enzym herein described, and the new saccharifying enzym itself are subject to deterioration, particularly in the saccharifying properties, upon keeping them for any considerable length of time. This tendency to deteriorate, so far as I have observed, seems to be due to some ingredient of the extract containing the new saccharifying principle herein described or in the precipitated principle obtained therefrom and that by the removal of this ingredient the extract or precipitated principle when departed from this ingredient may be kept and stored without fear of losing its virtues. Various modes of separating this ingredient may be resorted to. I have discovered that said ingredient is rendered insoluble and may be precipitated from the extract if an acid condition be induced in the extract or solution. One method of bringing about this acid condition is by fermentation. In order to accomplish this, the extract is subjected to proper fermenting conditions by allowing the same to stand for a period of from thirty to fifty hours, preferably about forty-eight hours, in a warm room at summer temperature—viz., about 80° to 90° Fahrenheit. The fermentation sets in with the formation of a whitish precipitate. The precipitate having formed, the supernatant liquid is drawn off. This liquid contains the saccharifying enzym in a more stable and permanent form than before. It may be concentrated by evaporation at low temperature to a syrupy consistency and preserved. This liquid may then be added in any suitable or desired proportions to a solution of ordinary diastase or a diastase or other substance possessing starch-liquefying properties and the mixed liquids precipitated by means of alcohol. The precipitate so obtained possesses both the liquefying and saccharifying diastatic properties in a more stable and permanent form, in which it may be kept or stored without deterioration or loss of its saccharifying powers; or instead of subjecting the extract to the process of fermentation, as above referred to, a similar condition may be brought about by the addition of some dilute acid—as, for instance, lactic acid. A whitish precipitate similar to that above referred to will be formed and may be removed by filtration or otherwise separated from the liquid. The liquid may then be treated with alcohol to precipitate the saccharifying principle therefrom or mixed with a solution of diastase possessing starch-liquefying properties and the mixed fluid precipitated with alcohol, with the result that a similar diastatic substance is produced having both liquefying and saccharifying properties in stable and permanent form not subject to deterioration.

By the above invention I am enabled to produce and isolate a new and useful enzym or diastatic agent possessing remarkable saccharifying properties in a concentrated form, which may be used with diastases heretofore known to greatly increase their efficiency and usefulness and also to produce a diastase possessing the desired proportions of liquefying and saccharifying enzyms and by means of which the amount of diastases at present known which is necessary to accomplish the conversion of a given amount of starchy material into sugar may be greatly reduced, thus effecting a large saving in the cost of such process and at the same time giving a diastatic agent of definite and known composition as regards its liquefying and saccharifying ingredients.

Having thus described my invention and the manner of making and using the same, what I claim, and desire to protect by Letters Patent, is—

1. The process for producing a diastatic substance which consists in making a fluid extract of grains or roots of the character described, or of such materials after the removal therefrom of the whole or a portion of their starchy constituents, precipitating from said extract associated extractive matters which have a deteriorating effect on the stability or permanence thereof, and adding the fluid extract so obtained in desired quantity to a substance having starch-liquefying properties.

2. The process for producing a diastatic substance which consists in making a fluid extract of grains, or roots of the character described or of such materials after the removal therefrom of the whole or a portion of their starchy constituents, precipitating from said extract associated extractive matters which have a deteriorating effect on the stability or permanence thereof, treating the fluid extract obtained with alcohol, collecting the precipitate and adding the same in desired quantity to a substance having starch-liquefying properties.

3. The process of producing a saccharifying diastatic substance having practically no liquefying action on starch, but having marked saccharifying action on liquefied or gelatinized starch, said process consisting in making a fluid extract of grains or roots of the character described, or of such materials after the whole or a portion of their starchy constituents have ben removed and precipitating from said extract associated extractive matters having a deteriorating influence on the permanence, stability and keeping qualities of said saccharifying diastatic substance.

4. The process of producing a saccharifying diastatic substance having practically no liquefying action on starch but having marked saccharifying action on liquefied or gelatinized starch, said process consisting in making a fluid extract of grains or roots of the character described, or of such substances after the whole or a portion of their starchy constituents have been removed, inducing an acid condition in said extract, and separating the fluid from the precipitate formed.

5. The process of producing a saccharifying diastatic substance in a permanent and stable form which consists in making an aqueous extract of grains or roots of the character described, or of such substances after the whole or a portion of their starchy constituents have been removed, subjecting said extract to acid fermentation, and removing the precipitate formed.

6. The process of producing a saccharifying diastatic substance in a permanent and stable form which consists in making an aqueous extract of grains or roots of the character described, or of such substances after the whole or a portion of their starchy constituents have been removed, subjecting said extract to acid fermentation, removing the precipitate formed, treating the fluid with alcohol and collecting the desired precipitate.

7. The process of producing a saccharifying diastatic substance in a stable form which consists in making an aqueous extract of grains or roots of the character described, or of such substances after the whole or a portion of their starchy constituents have been removed, subjecting said extract to a temperature of from 80° to 90° Fahrenheit for a period of from thirty to fifty hours and removing the precipitate formed.

8. The herein-described diastatic substance having a whitish color in dry form, soluble in water, difficultly soluble in alcohol, having practically no liquefying action on starch, but having marked saccharifying action on liquefied starch, and substantially free from foreign or associated matters which have a destructive or deteriorating effect on its saccharifying properties.

9. A diastatic substance possessing both starch liquefying and saccharifying properties and in which the saccharifying properties are constituted in whole or in part by an extrinsic diastatic substance having practically no liquefying action on starch.

10. A diastatic substance in stable form or condition consisting of a mixture of a substance having a liquefying action on gelatinized starch and a diastatic substance having substantially no action upon gelatinized starch but having marked saccharifying action on liquefied starch or starch solution and freed from deteriorating ingredients.

JOKICHI TAKAMINE.

Witnesses:
HENRY C. WORKMAN,
MATHILDA HELEN ANDRES.